UNITED STATES PATENT OFFICE.

MORITZ ULRICH, OF ELBERFELD, PRUSSIA, GERMANY, ASSIGNOR TO THE FARBENFABRIKEN, VORMALS FR. BAYER & CO., OF SAME PLACE.

BLUE CARBON DYE.

SPECIFICATION forming part of Letters Patent No. 423,970, dated March 25, 1890.

Application filed October 9, 1889. Serial No. 326,488. (Specimens.) Patented in Germany December 7, 1886, No. 40,893.

*To all whom it may concern:*

Be it known that I, MORITZ ULRICH, chemist, doctor of philosophy, and a subject of the German Emperor, residing at Elberfeld, Prussia, German Empire, have invented certain new and useful Improvements in the Manufacture of Blue Dye-Stuffs, (for which I have obtained Letters Patent in Germany under date of December 7, 1886, and numbered 40,893;) and I do hereby declare the following to be a full, clear, and exact description of the invention, such as will enable others skilled in the art to which it appertains to make and use the same.

This invention relates to the manufacture of new blue coloring-matters for dyeing cotton without the use of a mordant by combining the tetrazo compounds of paradiamines with the dioxynaphthaline monosulpho-acids obtained by melting the alpha or beta naphthol di or tri sulpho-acids with a caustic alkali. These dyes are obtained, according to this invention, by the reaction of an aqueous solution of the tetrazo compounds of benzidine, ortho-toluidine, diamidophenyltolyl, diamidodiphenol ether, diamidophenyline oxide, diamidoditolyline oxide, diamidostilbene, or their sulphonic or carboxylic acids, in an aqueous solution of dioxynaphthaline sulpho-acids. The process next described herein will show how these dye-stuffs may be obtained in practice according to my invention.

First example: 6.6 kilos of hydrochlorate of benzidine are converted in the well-known manner into the muriatic tetrazo compound. The solution of the same is slowly poured under continuous stirring into an aqueous solution containing fourteen (14) kilos of the dioxynaphthaline monosulpho-acid, obtained by heating the so-called "alpha-naphthol alpha-disulpho-acid S" with caustic alkali and an excess of carbonate of soda. A blue solution of the new dye-stuff is formed, which is precipitated by common salt, then filtered and dried. This new dye-stuff is a substantive dye-stuff and dyes cotton directly in a soap bath a splendid reddish blue, and greener than the product known in commerce under the name of "azo-blue." If in this example, instead of benzidine chlorhydrate, the salts of ortho-toluidine, diamidophenyltolyl, diamidodiphenol ether, diamidodiphenyline oxide, diamidoditolyline oxide, or diamidostilbene are employed, (by combining one molecule of the tetrazo compounds of these paradiamines with two molecules of the dioxynaphthaline monosulpho-acid,) dye-stuffs are gained which have the same dyeing properties but are greener in shade than the dye-stuff above described; and if, instead of the dioxynaphthaline monosulpho-acid of the alpha-naphthol alpha-disulpho-acid S, the other dioxynaphthaline sulpho-acids obtained by melting the alpha or beta naphthol di or tri sulpho-acids with a caustic alkali are used, similar dye-stuffs are obtained. I have further found that the dioxynaphthaline sulpho-acids combine not only in the manner above described, but give by the reaction of one molecule of them with one molecule of the tetrazo compounds of the diamines intermediate products which are not dye-stuffs, but lead to such by combining with one molecule of another phenol, amide, or their sulpho or carbo acids.

Second example: 6.2 kilos toluidine sulphate suspended in water are converted in the well-known manner into the corresponding tetrazo compound and slowly added to an aqueous solution of 4.8 kilos of dioxynaphthaline sulpho-acid obtained by melting the so-called "beta-naphthol beta-disulpho-acid" F with a caustic alkali. By the addition of sodium acetate a blue precipitate is formed, which represents the new intermediate product. If this is combined with a solution of 4.8 kilos of another dioxynaphthaline monosulpho-acid obtained by melting the beta-naphthol alpha-disulpho-acid (the so-called "R salt") with an alkali a blue precipitate is formed which, after filtering and drying, dyes unmordanted cotton reddish blue. Instead of toluidine or dioxynaphthaline monosulpho-acids, all of the above-described paradiamines and dioxynaphthaline monosulpho-acids, respectively, will give the same results.

Having thus described my invention, what I claim, and desire to secure by Letters Patent, is—

1. The herein-described process of obtaining substantive dye-stuffs, which consists in combining the tetrazo compound of a paradiamine or the sulpho or carbo acids thereof with dioxynaphthaline sulpho-acid.

2. The herein-described process of obtaining substantive dye-stuffs, which consists in combining one molecule of the tetrazo compound of a paradiamine or the sulpho or carbo acids thereof with one molecule of dioxynaphthaline sulpho-acid.

3. The herein-described process of obtaining substantive dye-stuffs from intermediary products that are not dye-stuffs, which consists in combining one molecule of a paradiamine with one molecule of a dioxynaphthaline sulpho-acid, and then combining one molecule of the intermediary product obtained with another molecule of dioxynaphthaline sulpho-acid.

In testimony whereof I affix my signature in presence of two witnesses.

MORITZ ULRICH.

Witnesses:
HUGO SCHADDE,
CARL KRUEGER.